United States Patent
Park et al.

(10) Patent No.: US 10,067,415 B2
(45) Date of Patent: Sep. 4, 2018

(54) METHOD FOR DISPLAYING IMAGE USING PROJECTOR AND WEARABLE ELECTRONIC DEVICE FOR IMPLEMENTING THE SAME

(71) Applicant: Samsung Electronics Co., Ltd., Gyeonggi-do (KR)

(72) Inventors: Sungchul Park, Seoul (KR); Taegun Park, Gyeonggi-do (KR); Jiyoon Park, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 196 days.

(21) Appl. No.: 14/663,214

(22) Filed: Mar. 19, 2015

(65) Prior Publication Data

US 2015/0268548 A1    Sep. 24, 2015

(30) Foreign Application Priority Data

Mar. 19, 2014  (KR) .................. 10-2014-0032344

(51) Int. Cl.
| | |
|---|---|
| G03B 21/28 | (2006.01) |
| G02B 27/01 | (2006.01) |
| G03B 21/26 | (2006.01) |
| H04N 9/31 | (2006.01) |

(52) U.S. Cl.
CPC .......... *G03B 21/28* (2013.01); *G02B 27/017* (2013.01); *G02B 27/0179* (2013.01); *G03B 21/26* (2013.01); *H04N 9/3173* (2013.01); *H04N 9/3194* (2013.01); *G02B 2027/014* (2013.01); *G02B 2027/0138* (2013.01); *G02B 2027/0159* (2013.01); *G02B 2027/0178* (2013.01); *G02B 2027/0185* (2013.01); *G03B 2206/00* (2013.01)

(58) Field of Classification Search
CPC .............. G02B 27/017; G02B 27/0179; G02B 2027/0138; G02B 2027/014; G02B 2027/0159; G02B 2027/0178; G02B 2027/0185; G03B 21/26; G03B 21/28; G03B 2206/00; H04N 9/3173; H04N 9/3194

See application file for complete search history.

(56) References Cited

U.S. PATENT DOCUMENTS

| | | | |
|---|---|---|---|
| 7,209,160 B2 | 4/2007 | McNelly et al. | |
| 7,936,361 B2 | 5/2011 | Aufranc et al. | |
| 8,184,067 B1 | 5/2012 | Braun et al. | |
| 2005/0052623 A1 | 3/2005 | Hsiung | |
| 2012/0088581 A1 | 4/2012 | Mao et al. | |
| 2012/0156652 A1 | 6/2012 | Lane et al. | |
| 2012/0299870 A1 | 11/2012 | Chi et al. | |
| 2013/0021373 A1* | 1/2013 | Vaught ................. | G02B 27/017 345/633 |
| 2013/0258270 A1* | 10/2013 | Cazalet .................. | G02C 11/10 351/114 |
| 2015/0332502 A1* | 11/2015 | Seen ..................... | G06T 19/006 345/633 |

* cited by examiner

*Primary Examiner* — Sultan Chowdhury
*Assistant Examiner* — Magda Cruz

(57) ABSTRACT

A wearable electronic device is configured to project an image on a glass. The wearable electronic device include: a glass; a projector configured to output one or more images; a shutter unit positioned in front of the projector to output the images output from the projector toward the glass or in an outward direction; and a control unit configured to control the shutter unit.

19 Claims, 12 Drawing Sheets

FIG. 2
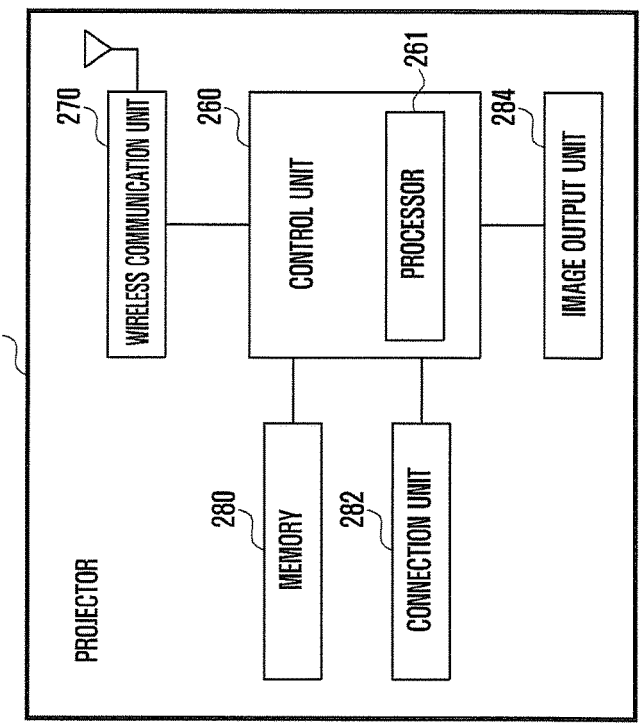
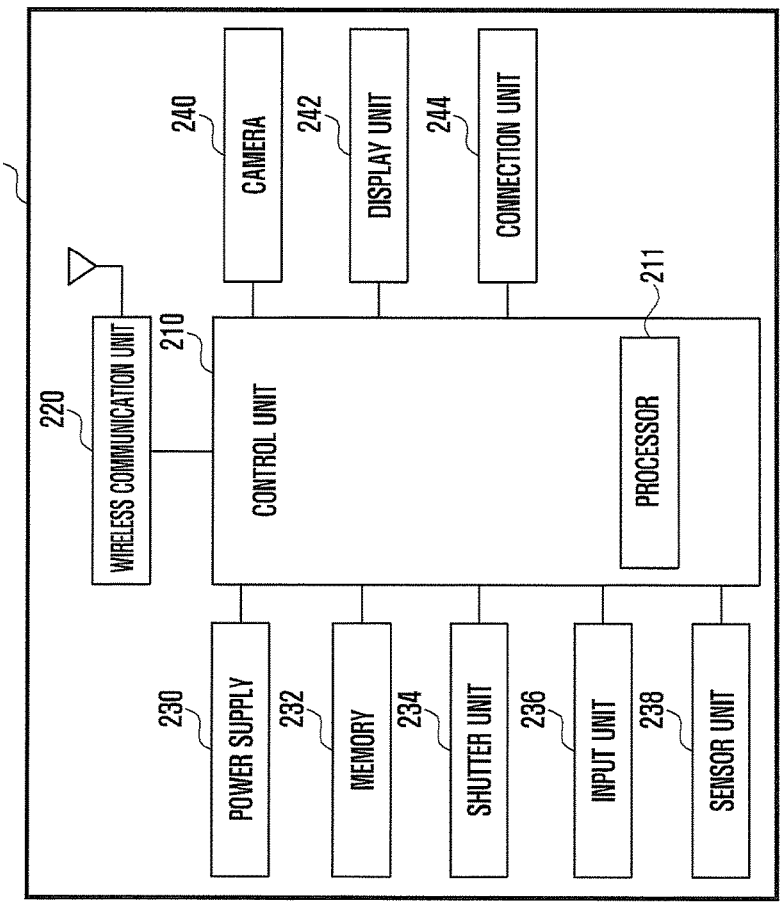

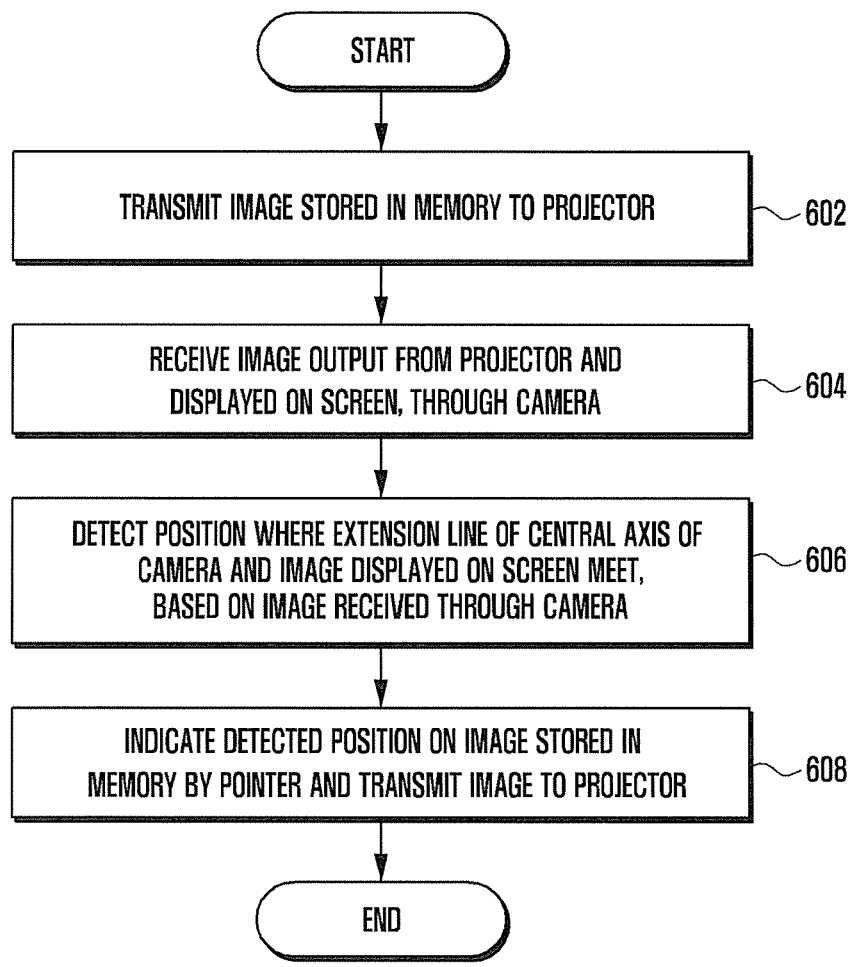

METHOD FOR DISPLAYING IMAGE USING PROJECTOR AND WEARABLE ELECTRONIC DEVICE FOR IMPLEMENTING THE SAME

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2014-0032344, filed on Mar. 19, 2014, which is hereby incorporated by reference for all purposes as if fully set forth herein.

TECHNICAL FIELD

The present disclosure relates to a method for displaying an image using a projector and a wearable electronic device for implementing the same.

BACKGROUND

A projector is one of image projection devices and refers to an electronic device capable of enlarging and projecting, for example, a photograph, a picture, or a character on a slide or a transparent sheet through a lens. Due to the development of techniques, a recent projector may output an image or a video in a file format as an image on a screen. That is, the projector may output an image so as to show the output image to many people. For example, the projector may be usefully used when conducting a seminar or a meeting. The projector is generally classified as a Cathode Ray Tube (CRT) projector, a Liquid Crystal Display (LCD) projector, or a Digital Light Processing (DLP) projector, depending on techniques of generating an image. The CRT projector is a system that amplifies an image signal from an external appliance in a cathode-ray tube (CRT) and projects the amplified image signal through a projection lens so that an image is produced on a screen. The CRT projector is also referred to as a PRT projector or a beam projector. The CRT projector employs a principle which is the same as that of an existing CRT TV. The CRT projector is advantageous in that it can provide the clearest image quality. However, the CRT projector is disadvantageous in that its brightness is limited and it is difficult to install and to perform convergence correction. Due to the disadvantages, the use of CRT projectors has gradually declined. The LCD projector refers to a projector that passes lights generated from a lamp through a transmission type LCD panel to be collected as one image, and projects the image to be formed on a screen. The LCD projector is currently widely used since it is compact and light compared to the CRT projector, and gives high performance for its money. However, the LCD projector may be poor in the reproducibility of natural colors compared to the CRT projector. The DLP projector refers to a projector that passes lights generated from a lamp through a wheel to reflect an image to a Digital Micro Device (DMD) chip, and enlarges and projects the reflected image. The DMD chip is configured such that fine mirrors are switched thousands of times, or more, to selectively reflect light or not so that a high resolution and high definition image can be implemented. The DLP projector is controlled in a fully digitized manner. Thus, the DLP projector exhibits high utilization efficiency of light compared to the CRT projector and the LCD projector which are analog systems so that the DLP projector may be excellent in the quality of an image projected at the same brightness and color reproducibility. DLP projectors have not been popular due to high initial prices and high maintenance costs thereof. However, as the prices of DMD chips have declined, the prices of DLP projectors also have declined and the demand for the DLP projectors increases.

SUMMARY

A projector enlarges and displays an image on a screen. When the image is displayed on the screen using the projector, many people can simultaneously watch the same image. For example, when delivering a lecture, a lecturer may show an image related to the lecture to the audience using the projector. In that event, the lecturer may have information that should be kept in his or her closet without being opened to the audience. According to an embodiment of the present disclosure, an image to be shown to the audience and an image to be shown only to the lecturer himself, or herself, is alternately output using a single projector. A projector according to an embodiment of the present disclosure is attached to the lecturer's wearable electronic device, such as a spectacle type electronic device, and a shutter unit attached in front of the projector. The wearable electronic device includes a glass, or lens, on which an image emitted from the projector is projected. In an embodiment of the present disclosure, two images are alternately output from the projector, and the wearable electronic device controls the operation of the shutter unit so that the image to be shown to the audience is output to the screen and the image to be shown only to the lecturer is output to the glass of the wearable electronic device. That is, the control unit of the wearable electronic device causes two images to be alternately output using one projector. In addition, the control unit controls the shutter unit such that two images are output to different positions, such as, the screen and the glass.

To address the above-discussed deficiencies, it is a primary object to provide a wearable electronic device. The wearable electronic device includes: a glass or lens; a projector configured to output one or more images; a shutter unit positioned in front of the projector to output the images output from the projector toward the glass or in an outward direction; and a control unit configured to control the shutter unit.

In accordance with another aspect of the present disclosure, there is provided a method for outputting an image of a wearable electronic device provided with a shutter unit and a projector. The method includes: controlling the shutter unit such that one or more images output from the projector is output toward a glass or in an outward direction.

In accordance with the aspects of the present disclosure, two images are output alternately from one projector to be output to the glass of the wearable electronic device and the outside (e.g., a screen), respectively. Here, the image output to the outside is an image to be opened, and the image output to the glass is an image that is visible only to the user. When giving a lecture or a PT presentation, the user can use two images that are respectively output to different positions using the one projector. Since, the user uses one projector, the costs may be reduced and the convenience may be enhanced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a hardware configuration of a wearable electronic device and a projector according to an embodiment of the present disclosure;

FIG. 6 illustrate a process for indicating a user's visual line on an image output from a projector by a pointer when a projector is separated from a wearable electronic device according to an embodiment of the present disclosure;

Throughout the drawings, it should be noted that like reference numbers are used to depict the same or similar elements, features, and structures.

DETAILED DESCRIPTION

Figure 1:
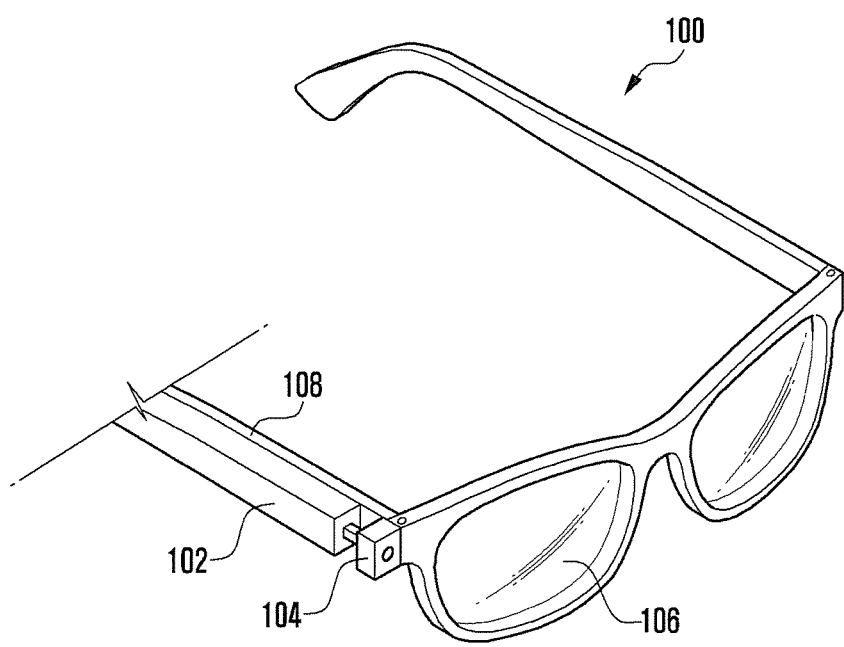
FIG. 1 illustrates a practical configuration of a wearable electronic device and a projector according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system. Hereinafter, various embodiments of the present disclosure will be described with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

A wearable electronic device according to an embodiment of the present disclosure can be a glasses-shaped electronic device including a communication function to enable wired or wireless communication with another electronic device. Further, a wearable electronic device according to an embodiment of the present disclosure can be an electronic device including glass specially manufactured to allow identification of an image through the glass.

Although an embodiment of the present disclosure employs glasses as an example of a wearable electronic device including a communication function, it is obvious to a person skilled in the art that the wearable electronic device according to an embodiment of the present disclosure is not limited to glasses.

The term "module" used in the present disclosure may refer to, for example, a unit including one or more combinations of hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an application-specific integrated circuit (ASIC) chip, a field-programmable gate array (FPGA), and a programmable-logic device for performing certain operations, which are now known or will be developed in the future.

FIG. 1 illustrates practical configurations of a wearable electronic device and a projector according to an embodiment of the present disclosure. The wearable electronic device 100 according to the embodiment of the present disclosure is exemplified as spectacles.

Referring to FIG. 1, the wearable electronic device 100 includes a projector 102 that is attached to the wearable electronic device 100 (e.g., a temple 108), and a shutter unit 104 that is positioned in front of the projector 102 and attached to the wearable electronic device 100 (e.g., temple 108). Here, the shutter unit 104 can be operated by a user input to pass there through, or reflect an image projected from the projector 102. The projector 102 receives an image from the wearable electronic device 100 and outputs the image. That is, the image output from the projector 102 is output through the shutter unit 104 positioned in front of the projector 102. The projector 102 and the wearable electronic device 100 can be connected via a wireline connection with each other via a connection unit. At this time, the wearable electronic device 100 transmits an image or supply power to the projector 102 via the connection unit. In addition, the projector 102 and the wearable electronic device 100 can be connected via a wireless connection with each other using a wireless communication unit. Further, the projector 102 can be operated separately from the wearable electronic device 100. When the projector 102 is separated from the wearable electronic device 100, the projector 102 is supplied with the power from an external power supply device via the connection unit. The projector 102 and the wearable electronic device 100 transmit or receive an image wirelessly when they are separated from each other. When the projector 102 is separated, the shutter unit 104 of the wearable electronic device 100 may stop its operation. The shutter unit 104 of the wearable electronic device 100 is operated when the wearable electronic device 100 is in a composite image mode. Here, the composite image mode refers to a mode in which two different images are alternately output from the projector 102 at predetermined time intervals. When two images are alternately output from the projector 102, the shutter unit 104 reflects one of the two images so that the two images are output to different positions, respectively. For example, the wearable electronic device 100 causes one of the two images passing through the shutter unit 104 to be output to the screen positioned in front of the wearable electronic device 100 and causes the shutter unit 104 to reflect the other image so that the other image is output to the display unit of the wearable electronic device 100. That is, the wearable electronic device 100 controls the shutter unit so as to determine an image output direction as the outward direction, such as in a direction viewed by the user, or the glass direction, such as to the display unit of the wearable electronic device 100. Here, the outward direction is a direction in which the image is output from the projector 102. In addition, the glass direction is directed to the position where the display unit of the wearable electronic device 100 is positioned. At this time, the display unit corresponds to the glass 106 of the wearable electronic device 100, and the image output from the projector is visible to the user through the glass 106. Here, the glass 106 is a translucent reflector fabricated in a special form like a windshield of a Head-Up Display (HUD) used for an automotive vehicle. The electronic device 100 adjusts the transparency of the reflector according to the user's setting. The windshield is a translucent reflector having a special plastic film embedded in a glass so as to allow an image to be projected thereon. The glass 106 specially fabricated in this manner enables the image output from the projector 102 to be projected thereon. In addition, the glass 106 is a translucent display that displays the image received from the shutter unit 104 to be reflected. Although two images are alternately output to the screen and the glass 106 of the electronic device 100 by the shutter unit 104 as described above, the user may believe that the two images are simultaneously output since the two images are output at speeds that make the time difference between the two images imperceptible by naked eyes.

FIG. 2 illustrates a hardware configuration of a wearable electronic device and a projector according to an embodiment of the present disclosure.

Referring to FIG. 2, the wearable electronic device 200 according to an embodiment of the present disclosure includes a control unit 210, a wireless communication unit 220, a power supply 230, a memory 232, a shutter unit 234, a user input unit 236, a sensor unit 238, a camera 240, a display unit 242, and a connection unit 244.

The control unit 210 includes at least one processor 211. The control unit 210 connects the components described above and control communication there-between. For example, the control unit 210 transmits an image stored in the memory 232 to the projector 250 via a wireline or wireless connection. That is, the control unit 210 is connected with the projector 250 wireline via the connection unit 244 or wirelessly via the wireless communication unit 220. In addition, the control unit 210 transmits signals to the components according to the user's input signal received through the user input unit 236. The control unit 210 controls the functions of the wearable electronic device 200 through the signals. In this manner, the control unit 210 organically controls the communication between the components.

The processor 211 of the control unit 210 receives power from the power supply 230 to control each of the components. The processor 211 of the control unit 210 transmits an image stored in the memory 232 to the projector 250 via a wireline connection through the connection unit 244 or wirelessly through the wireless communication unit 220. In addition, the processor 211 of the control unit 210 stores an image received through the camera 240 in the memory 232. The processor 211 of the control unit 210 combines an image stored in advance in the memory 232 and the image received through the camera, and transmits the combined image to the projector. The processor 211 of the control unit 210 confirms a key input through the user input unit 236 to perform a function corresponding to the key input. When the input key corresponds to a key input that operates the shutter unit, the processor 211 of the control unit 210 operates the shutter unit 234. The processor 211 causes two images output from the projector 250 to be output to different positions, respectively, using the shutter unit 234. That is, the processor 211 can cause one of the two images to be output onto the screen positioned in front of the wearable electronic device 200, and the other image reflected by the shutter unit 234 to be output to the display unit 242. In other words, the processor 211 controls the shutter unit 234 so as to determine the positions to which the images are output. The processor 211 of the present embodiment is included in the control unit 210. Thus, the term "control unit 210" can be used in place of the term "processor 211".

The wireless communication unit 220 includes, for example, Wireless-Fidelity (WiFi), BLUETOOTH (BT), Global Positioning System (GPS) or near field communication (NFC). The wireless communication unit 220 provides a wireless communication function using a radio frequency. In addition, the wireless communication unit 220 includes, for example, a modem or network interface, such as a Local Area Network (LAN) card, so as to connect the wearable electronic device 200 to a network, such as the Internet, a LAN, a Wire Area Network (WAN), a telecommunication network, a cellular network, a satellite network, or a Plain Old Telephone Service (POTS). The wireless communication unit 220 enables the wearable electronic device 200 and the projector 250 to transmit or receive an image wirelessly there-between. In addition, the wireless communication unit 220 enables the wearable electronic device 200 and another electronic device to transmit or receive data wirelessly there-between.

The processor 211 is supplied with power from the power supply 230 in order to perform the communication between the components of the wearable electronic device 200 or the functions of the wearable electronic device 200. The power supply 230 can be a battery connected to the wearable electronic device 200. In addition, the power supply 230 can be an external power supply device that supplies power from the outside. The processor 211 can charge the battery using the power supplied from the outside.

The memory 232 stores commands or data received from the processor 211 or other components, such as the wireless communication unit 220 and the connection unit 244, or generated by the processor 211 or the other components. The processor 211 of the present embodiment stores an image from other electronic devices through the wireless communication unit 220, or an image received through the camera 240, in the memory 232.

When the processor 211 confirms a mode switch signal, the shutter unit 234 is operated. Here, the mode switch signal can be a key input through the user input unit 236. When the mode switch signal is included in an image transmitted to the projector, the processor 211 confirms the mode switch signal. The shutter unit 234 according to the present embodiment is operated when the processor 211 confirms the mode switch input and switches the single image mode to the composite image mode.

The user input unit 236 includes keys for executing specific functions of the electronic device 200. The processor 211 of the control unit 210 confirms the user's key input through the user input unit 236 so as to control the shutter unit 234 or the camera 240. The processor 211 of the control unit 210 confirms a signal received from the user input unit 236 and executes a function corresponding to the signal. The user input unit 236 according to the embodiment of the present disclosure confirms a mode switch input from the user input unit.

The sensor unit 238 includes at least one of a gesture sensor, a gyro sensor, an atmospheric pressure sensor, a magnetic sensor, an acceleration sensor, a grip sensor, a proximity sensor, a biometric sensor, an illuminance sensor, and an Ultra-Violet (UV) sensor. The sensor unit 238 measures a physical amount or sense the operation state of the wearable electronic device 200 and converts the measured or sensed information into an electric signal. For example, the sensor unit 238 senses the user's touch input and converts the corresponding information into an electric signal. The user causes specific functions to be executed in the wearable electronic device 200 by touching the components of the wearable electronic device 200 or moving the wearable electronic device 200 up and down, left and right.

The camera 240 is a device capable of photographing an image or a video. According to an embodiment, the camera 240 includes at least one image sensor (e.g., a front lens or a rear lens), an Image Signal Processor (ISP) (not illustrated) or a flash LED (not illustrated). The processor 211 receives an image output from the projector 250 through the camera and stores the image in the memory 232. In addition, the processor 211 defines the central point of the image, such as the central point of the camera as a person's visual line and indicates the central point by a pointer. The processor 211 combines an image output from the projector 250 and an image having the pointer indicated thereon and causes the projector 250 to output the combined image. The processor 211 indicates the user's visual line on the image output from the projector 250 by the pointer.

The display unit 242 can be the glass of the wearable electronic device 200 on which the image output from the projector 250 can be displayed. The image output from the projector 250 is visible to the user through the glass. The glass can take a form of a windshield of a head-up display. That is, the glass can be a translucent reflector on which an image can be projected like the windshield. The head-up display is a front display device designed such that information of an automotive or a plane is displayed on the front glass. The windshield is a translucent reflector embedded in glass so as to project an image thereon. The glass is specially manufactured in this manner so that an image output from the projector 250 can be projected thereon. In addition, the glass can be a translucent display configured to display an image received from the shutter unit 234 to be reflected. The processor 211 according to the present embodiment causes the shutter unit 234 to reflect the image output from the projector 250 so that the image is output to the display unit 242. That is, the processor 211 outputs an image including personal information to be visible only to the user from the display unit 242.

The connection unit 244 includes a High-Definition Multimedia Interface (HDMI), a Mobile High-definition Link (MHL), a Universal Serial Bus (USB), or a D-subminiature (D-sub). In addition, the connection unit 244 includes a Secure Digital/Multi-Media Card (SD/MMC), or an Infrared Data Association (IrDA). The connection unit 244 according to the present embodiment is a component connected for power supplying or image data transmission/reception between the wearable electronic device 200 and the projector 250. In addition, the connection unit 244 may be a charge terminal for charging the battery connected to the wearable electronic device 200 or for supplying power from the outside.

Referring to FIG. 2, the configuration of the projector 250 according to the present embodiment may include a control unit 260, a wireless communication unit 270, a memory 280, a connection unit 282, and an image output unit 284.

The control unit 260 of the projector 250 includes at least one processor 261. The control unit 260 of the projector 250 connects the wireless communication unit 270, the memory 280, the connection unit 282, and the image output unit 284 with each other and control the communication between the components described above. For example, the control unit 260 stores an image received through the connection unit 282 or the wireless communication unit 270 in the memory 280, and outputs the image stored in the memory 280 through the image output unit 284.

The processor 261 of the projector 250 manages the image received from the wearable electronic device 200. Here, the wearable electronic device 200 and the projector 250 may be connected via a wireline connection through the connection unit 244 or wirelessly through the wireless communication unit 220. The processor 261 of the projector 250 not only receives the image from the wearable electronic device 200, but also can be supplied with power from the wearable electronic device 200, through the connection unit 282. The processor 261 of the projector 250 drives the projector 250 using the power supplied from the wearable electronic device 200. When the wearable electronic device 200 and the projector 250 are separated from each other, the processor 261 can be supplied with power by connecting the connection unit 282 and an external power supply device, such as an external battery. In addition, the processor 261 can supplied with power through the projector's own battery embedded in the separated projector 250. The processor 261 stores an image received from the wearable electronic device 200 in the memory 280 and outputs the image through the image output unit 284.

The wireless communication unit 270 of the projector 250 includes Wireless-Fidelity (WiFi), BLUETOOTH (BT), Global Positioning System (GPS), or Near Field Communication (NFC), like the wearable electronic device 200. In addition, the wireless communication unit 270 provides a wireless communication function using a radio frequency. The wireless communication unit 270 of the projector 250 according to the present embodiment enables an image to be received from the wearable electronic device 200 wirelessly.

The memory 280 of the projector 250 stores the image received from the wearable electronic device 200. The memory 280 of the projector 250 can be a buffer configured to temporarily store the image received from the wearable electronic device 200 and to output the image through the image output unit 284.

The connection unit 282 of the projector 250 includes a High-Definition Multimedia Interface (HDMI), a Universal Serial Bus (USB), or a D-subminiature (D-sub), like the wearable electronic device 200. In addition, the connection unit 282 includes a Secure Digital/Multi-Media Card (SD/MMC) or an Infrared Data Association (IrDA). The connection unit 282 of the projector 250 according to the present embodiment is a component of the projector 250 for receiving power or image data from the wearable electronic device 200. In addition, when the projector 250 is separated from the wearable electronic device 200, the processor 261 of the projector 250 can be supplied with power from an external power supply device, such as an external battery, through the connection unit 282.

The image output unit 284 of the projector 250 causes the image received from the wearable electronic device 200 to be output from the projector 250. That is, the processor 261 of the projector 250 stores the image received from the wearable electronic device 200 in the memory 280 and then outputs the image through the image output unit 284.

Figure 3:
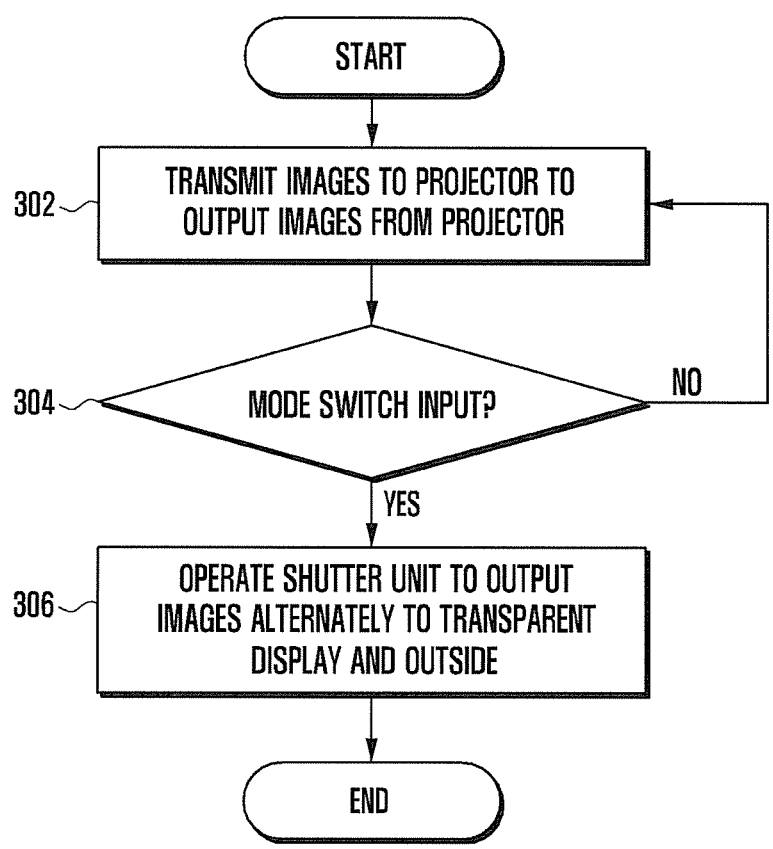
FIG. 3 illustrates a process for displaying two images using a projector in a wearable electronic device according to an embodiment of the present disclosure.

FIG. 3 illustrates a process for displaying two images using the projector in the wearable electronic device according to the embodiment of the present disclosure.

Referring to FIG. 3, in step 302, the processor 211 of the wearable electronic device 200 transmits images to the projector 250 so that the projector 250 outputs the images. At this time, the wearable electronic device 200 is in the single image mode. In the single image mode, the processor 211 of the wearable electronic device 200 transmits a single image to the projector 250 so that the single image can be output from the projector 250. In step 304, the processor 211 of the wearable electronic device 200 confirms the mode switch input through the user input unit 236. Here, the mode switch confirmation can be made not only on a key input sensed by the user input unit 236, but also on a mode switch signal included in an image. That is, the confirmation on the mode switch input can be confirmation on the mode switch signal. When no mode switch input exists in step 304, the processor 211 of the wearable electronic device 200 causes the single image to be continuously output through the projector 250 in the single image mode. When the mode switch input is confirmed through the user input unit in step 304, the processor 211 of the wearable electronic device 200 operates the operation of the shutter unit 234 in step 306 so that the images output from the projector 250 are alternately displayed on the glass and the outside. That is, when the mode switch input is confirmed, the processor 211 of the wearable electronic device 200 switches the modes from the single image mode to the composite image mode. Here, the composite image mode refers to a mode in which the wearable electronic device 200 outputs two image alternately at predetermined time intervals. In the composite image mode, for example, the projector 250 outputs sixty (60) frames per sec. In the composite image, the processor 211 outputs two different images alternately through the projector 250. That is, among sixty (60) frames per sec, the processor 211 outputs one image of composite images (two images) at the odd-order frames and the other image of the composite image at the even-order frames. In other words, in the composite image mode, the processor 211 outputs two images alternately such that each of the two images is output by thirty (30) frames per sec. In addition, in the composite image mode, the processor 211 of the wearable electronic device 200 operates the shutter unit 234. The images output from the projector 250 in the composite image mode are output through the shutter unit 234. For example, here, the shutter unit 234 can be operated at a speed of sixty (60) Hertz (Hz). When the processor 211 outputs sixty (60) frames per sec, the even-order frames are reflected by the shutter unit 234 to be output to a different position. In the composite image mode, after the shutter unit 234 is operated, the processor 211 of the wearable electronic device 200 transmits the composite images to the projector so that the composite images are output from the projector. In the composite image mode, the processor 211 outputs one image of the composite image to the outside and the other image of the composite images is reflected by the shutter of the shutter unit 234 to be output to the display unit 242, such as, the glass, wearable electronic device 200. Here, the outside can be an external screen positioned in the direction of visual line of the user who wears the wearable electronic device 200, or the front side of the wearable electronic device 200. For example, the processor 211 causes the projector 250 to output each of the two images by thirty (30) frames per sec so that sixty (60) frames per sec is output in total. At this time, the shutter unit 234 is operated at a speed of 60 Hz. Accordingly, among sixty (60) frames in total, the shutter unit 234 outputs the odd-order frames to the outside, and the even-order frames to the display unit 242, such as the glass, of the wearable electronic device 200. That is, the processor 211 outputs one image of the composite images to the outside by thirty (30) frames per sec, and the other image of the composite images to the glass by thirty (30) frames per sec.

Figure 4:
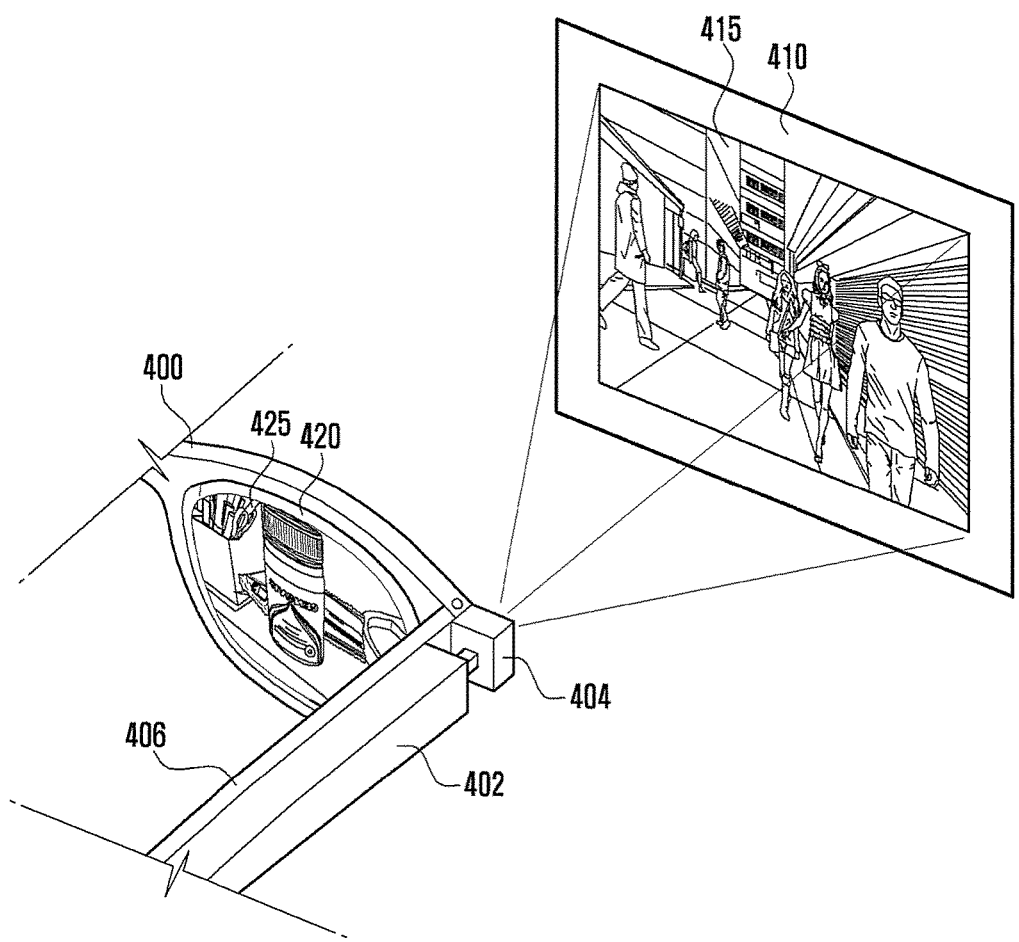
FIG. 4 illustrates a process for outputting two images to different positions, respectively, from a wearable electronic device using a projector according to an embodiment of the present disclosure.

FIG. 4 illustrates a method for outputting two images to different positions, respectively, from a wearable electronic device using a projector according to an embodiment of the present disclosure.

Referring to FIG. 4, a wearable electronic device 400 alternately outputs a first image 415 and a second image 425 from a projector 402 in the composite image mode. The projector 402 is attached to a temple 406 of the wearable electronic device 400. In addition, the shutter unit 404 is positioned in front of the projector 402 and attached to the temple 406 of the wearable electronic device 400 to pass there-through or reflect images output from the projector 402. Referring to FIG. 4, the wearable electronic device 400 is in the composite image mode, the first image 415 output from the projector 402 is output to a screen 410 through the shutter unit 404, and the second image 425 output from the projector 402 is reflected by the shutter unit 404 to be output to a glass 420 of the wearable electronic device 400. That is, the wearable electronic device 400 outputs the first image 415 to the outside and causes the second image 425 to be reflected by the shutter unit 404 to be output to the glass 420. The processor 211 of the wearable electronic device 400 outputs the images by sixty (60) frames per sec, and the first image 415 and the second image 425 are output alternately so that each of the first image 415 and the second image 425 are output by thirty (30) frames per sec. Since each of the images is output by thirty (30) frames per sec, the user may believe that two images are simultaneously output. Here, the first image 415 and the second image 425 are output one frame by one frame. That is, among sixty (60) frames in total, the first image is output at the odd-order frames and the second image is output at the even-order frames. The processor 211 of the wearable electronic device 400 operates the shutter unit 404 to be matched with the output speed of the first image 415 and the second image 425, which are output from the projector 402. The shutter unit 404 is operated at a speed of 60 Hz. Although the speed shutter unit 404 is set to 60 Hz in the present example, embodiments of the present disclosure are not limited thereto. The processor 211 of the wearable electronic device 400 causes only the first image 415 to be output to the screen 410 by thirty (30) frames per sec, and only the second image 425 to be output to the glass 420 serving as the display unit 242 by thirty (30) frames per sec. For example, when a teacher gives a lecture, the first image 415 can include questions to be explained to students. That is, the first image 415 can be an image containing data opened to the students to be sharable among all the students. Whereas, the second image 425 can be an image in which answers that cannot be opened to the students are indicated. That is, the second image 425 is an image containing information that can be confirmed only by the teacher through the glass 420 when the teacher gives the lecture. As described above, the wearable electronic device 400 separately outputs the first image 415 and the second image 425 to the screen 410 and the glass 420, respectively, and the second image 425 contains non-opened personal information. If the user of the wearable electronic device 400 does not wish to leak the first image 415 to the outside, the user can change the frequency of the image output from the projector 402 so as to prevent the image from being copied. That is, the projector 402 changes the frequency of the image and outputs the image having the changed frequency. For example, when the user directly sees the image output at a specific frequency with naked eyes, a fringe pattern is not visible to the user. However, when the image output at the specific frequency is photographed by a camera, the image of the fringe pattern can be photographed by the camera. That is, the camera is capable of receiving the image of the fringe pattern, rather than an image visible to the naked eyes. When the user changes the frequency of the image outputs from the projector 402, the user prevents others from copying the image using a camera.

Figure 5A:
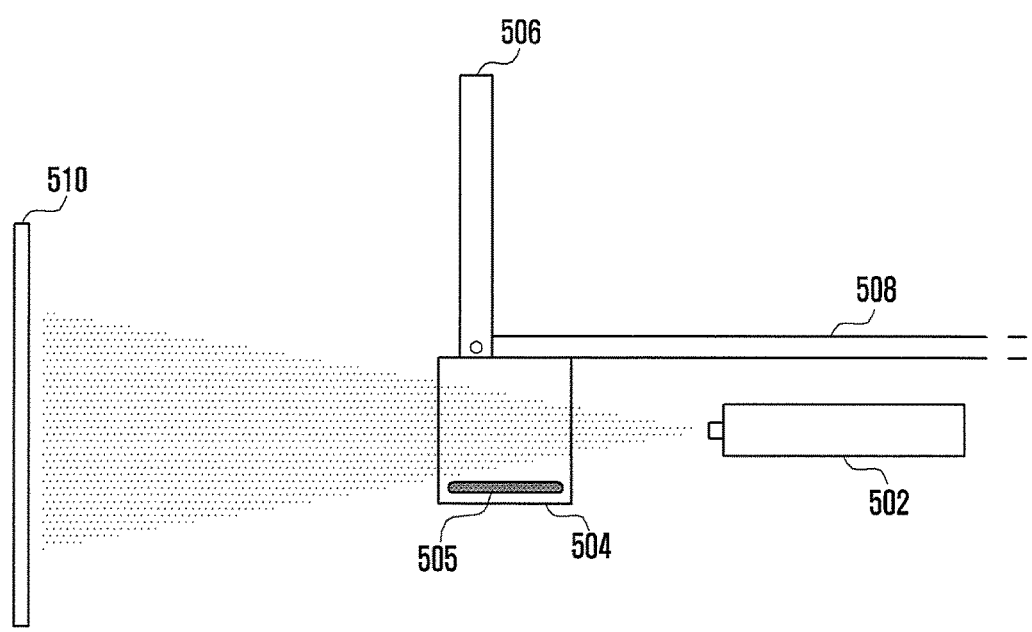
FIGS. 5a, 5b and 5c illustrates methods for displaying two images output from a projector to a screen and a glass, or lens, of a wearable electronic device, respectively, using a shutter unit according to an embodiment of the present disclosure.
Figure 5B:
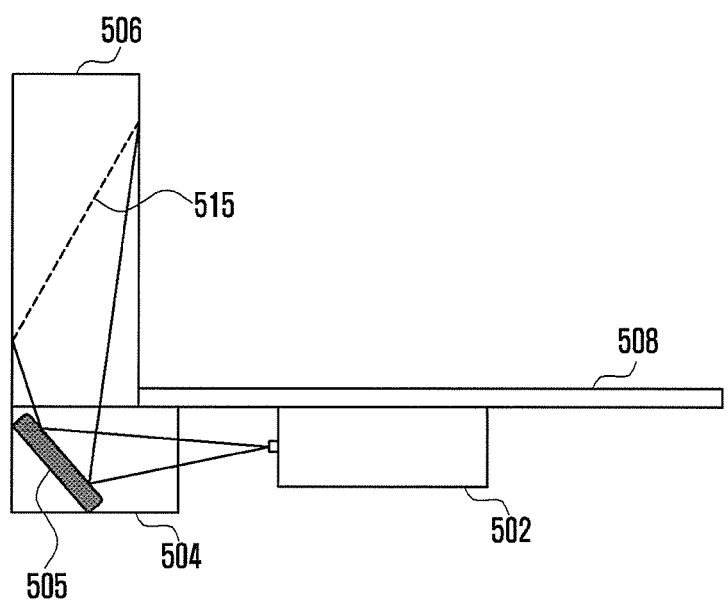
Figure 5C:
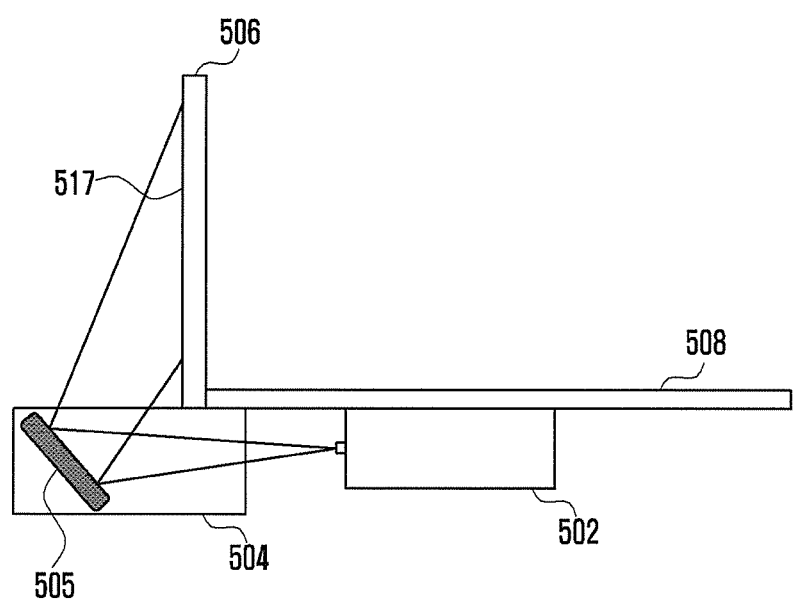

FIGS. 5a, 5b and 5c are illustrate methods for displaying two images output from a projector to a screen and a glass of a wearable electronic device, respectively, using a shutter unit according to an embodiment of the present disclosure.

FIGS. 5a, 5b and 5c illustrate a projector 502, a shutter unit 504, a glass 506, and a temple 508 separately from a wearable electronic device 200. Referring to FIGS. 5a, 5b and 5c, the wearable electronic device is in the composite image mode, and the processor 211 of the wearable electronic device 200 outputs a first image and a second image alternately through the projector 502. In addition, the processor 211 of the wearable electronic device 200 operates the shutter unit 504 in the composite image mode so that the first image and the second image can be output to the screen 510 and the glass 506, respectively.

Referring to FIG. 5a, the processor 211 outputs the first image from the projector 502. The first image is output through the shutter unit 504. At this time, the shutter 505 is opened, the processor 211 causes the first image to be output to the screen 510 positioned in front of the wearable electronic device 200. Here, the front side of the wearable electronic device 200 can be in the direction of visual line of the user who wears the wearable electronic device 200.

Referring to FIG. 5b, the processor 211 outputs the second image from the projector 502. The second image is also output through the shutter unit 504. At this time, the shutter 505 is closed and the second image output from the projector 502 is reflected by the shutter 505 to be output to an inner reflector 515 of the wearable electronic device 200. Here, the inner reflector 515 is included in glass 506 of the wearable electronic device 200. The inner reflector 515 of the wearable electronic device 200 can be a translucent reflector manufactured in a special form like a windshield. The windshield is a translucent reflector including a special plastic film embedded in glass to project an image thereon. In addition, the inner reflector 515 can be a translucent display configured to display an image received from the shutter unit 504 to be reflected.

Referring to FIG. 5c, when the shutter 505 is closed, the second image output from the projector 502 is projected to the outer reflector 517 of the wearable electronic device 200. Here, the outer reflector 517 can be of a type attached to the outside of the glass 506 of the wearable electronic device 200. In addition, the outer reflector 517 can also be of a type formed by coating a specific material on the outside of the glass 506 so that the images output from the projector 502 can be projected thereon.

FIG. 6 illustrates a process for indicating a user's visual line on an image output from a projector by a pointer when a projector is separated from a wearable electronic device according to an embodiment of the present disclosure.

Referring to FIG. 6, in step 602, the processor 211 of the wearable electronic device 200 transmits an image stored in the memory 232 to the projector 250. Here, the wearable electronic device 200 and the projector 250 are separated from each other and the processor 211 of the wearable electronic device 200 transmits the image to the projector 250 through the wireless communication unit 220. The separated projector 250 can be supplied with power from an external power supply device through the connection unit 282. Alternatively, a battery can be embedded in the projector 250 to be supplied with power. The image transmitted from the wearable electronic device 200 is output from the projector 250. In step 604, the processor 211 of the wearable electronic device 200 causes a part or the entirety of an image output from the projector 250 and displayed on the screen to be received through the camera 240. In step 606, the processor 211 of the wearable electronic device 200 detects a position (pixel) where an extension line of the central axis of the camera 240 and the image displayed on the screen meet with each other, based on the image received through the camera 240. Here, the position (pixel) where the extension line of the central axis of the camera 240 and the image displayed on the screen meet with each other is defined the user's visual line. That is, the detected position is a position for indicating the user's visual line on the image output to the screen. In step 608, the processor 211 of the wearable electronic device 200 indicates the detected position of an image stored in the memory 232 by the pointer and transmits the image to the projector 250. That is, the processor 211 transmits the image, on which the user's visual line is indicated by the pointer, to the projector. The projector 250 outputs the received image to the screen so that the user's visual line is indicated on the image output to the screen by the pointer. That is, when the user's visual line is changed, the position of the pointer appearing on the image output from the projector 250 also is moved along the user's visual line.

Figure 7:
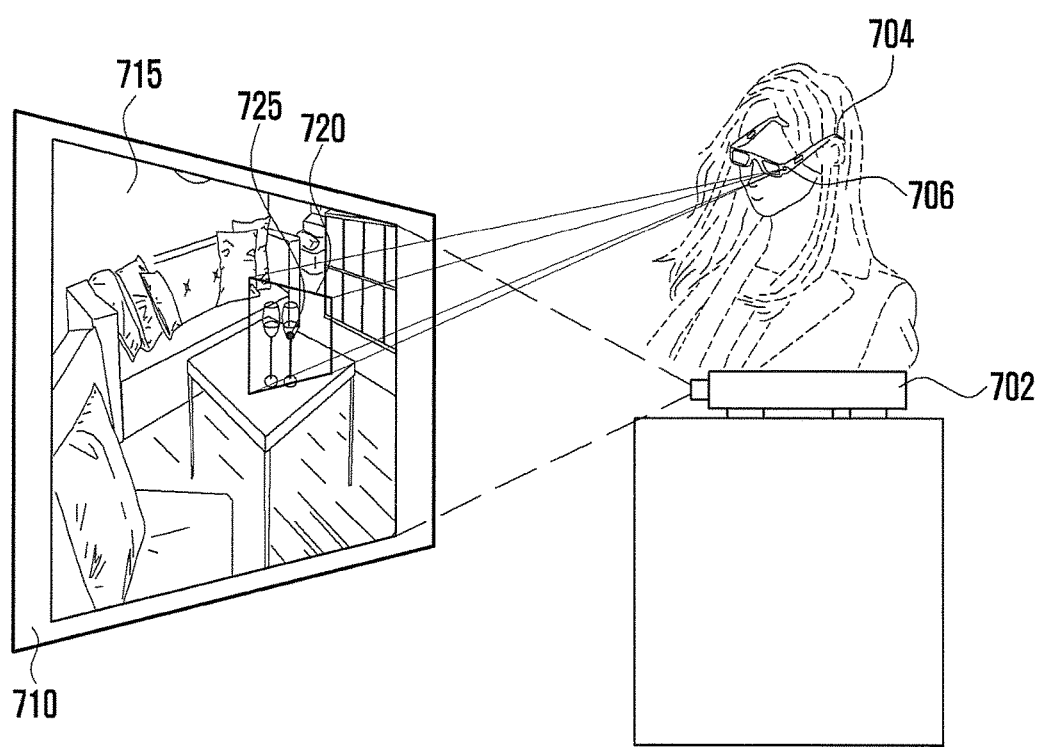
FIG. 7 illustrates a method for indicating a user's visual line on an image displayed on a screen by a pointer according to an embodiment of the present disclosure.

FIG. 7 illustrates a method for indicating a user's visual line on an image displayed on a screen by a pointer according to an embodiment of the present disclosure.

Referring to FIG. 7, a projector 702 may be separated from a wearable electronic device 704 and installed separately from the wearable electronic device 704. The projector 702 separated from the wearable electronic device 704 is connected with an external power supply device via a connection unit 282 to be supplied with power. Here, the external power supply device can be an external battery, such as a battery pack, or an AC power supply. In addition, the projector 702 can be supplied with power from a battery embedded in the projector 702. A processor 211 of the wearable electronic device 704 transmits an image stored in a memory 232 to the projector 702 separated from the wearable electronic device 704 through a wireless communication unit 220. The processor 261 of the projector 702 stores an image 715 received from the wearable electronic device 704 in the memory 280 and outputs the image 715 to the screen 710. In addition, the processor 211 of the wearable electronic device 704 receives a part 720 or the entirety of the image 715 output to a screen 710 through a camera 706. The processor 211 of the wearable electronic device 704 may define the central axis of an image 720 received through the camera 706 (e.g., the central axis of the camera) as a human's visual line and indicate the central axis by a pointer 725. That is, the processor 211 detects a position (pixel) where the extension line of the central axis of the camera and the image 715 displayed on the screen 710 meet with each other, based on the image 720 received through the camera 706. In addition, the processor 211 indicates the detected position (pixel) on an image stored in the memory 232 by the pointer 725 and transmits the image to the projector 702. A processor 261 of the projector 702 outputs the image, on which the central axis of the camera 706 is indicated by the pointer 725, to the screen 710. Here, the processor 211 determines a position where the image having the pointer 725 indicated thereon, is combined, using an Open Source Computer Vision (OPEN CV) library. The processor 211 detects the outer boundary of the image output from the projector 702 and displayed on the screen 710 using the open source computer vision library. That is, the processor 211 detects the outer boundary part of the image received from the camera 706. In addition, the processor 211 detects a position (pixel) where the extension line of the central axis of the camera 706 and the image output from the projector 702 and displayed on the screen 710 meet with each other, based on the detected outer boundary part. Here, it may be defined that the position (pixel) indicates the user's visual line. That is, the processor 211 outputs an image, on which the pointer 725 indication point is changed along the user's visual line, to the screen 710.

Figure 8:
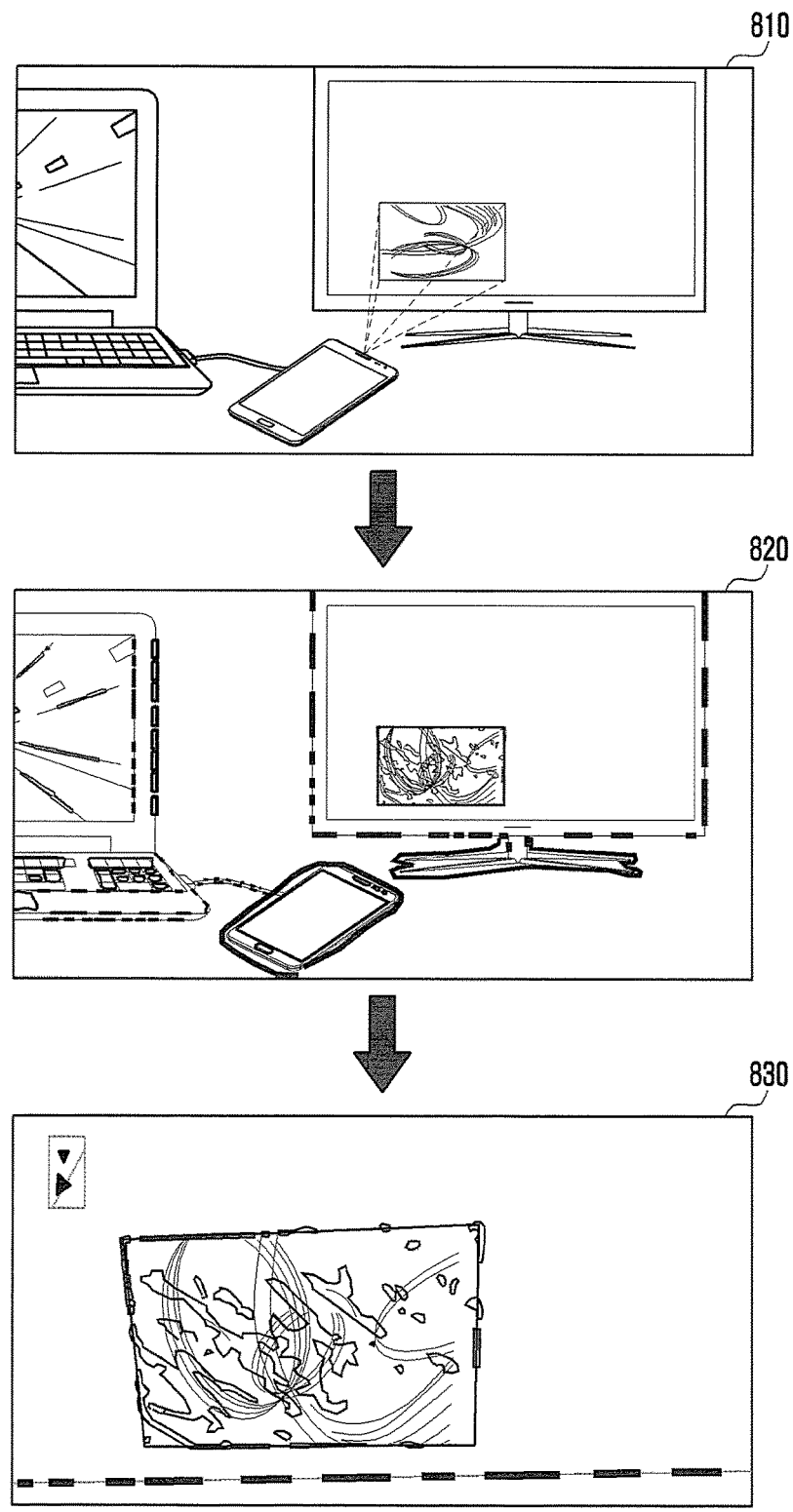
FIG. 8 illustrates a technique for recognizing an image displayed on a screen by a wearable electronic device according to an embodiment of the present disclosure.

FIG. 8 illustrates a method for recognizing an image displayed on a screen by a wearable electronic device according to an embodiment of the present disclosure.

Referring to FIG. 8, a processor 211 of a wearable electronic device 200 recognizes an output image three-dimensionally using an Open Source Computer Vision (OPEN CV) library. The OPEN CV library is a real time computer image program library that is used in application programs of, for example, object, face and action recognition, lip reading, and motion tracking. The OPEN CV library is an open source library including an algorithm optimized for analyzing a lot of images. The OPEN CV library was introduced in 1999 and has been frequently adopted in researcher and developer communities in the computer vision field as a main developing tool. The processor 211 of the wearable electronic device 200 sees an image output from a projector 250 three-dimensionally like a human using the OPEN CV library. In picture 810, a portable projector outputs an image on a computer monitor. Picture 820 can be an image displayed through the OPEN CV library program. In picture 830, the processor 211 of the wearable electronic device 200 can three-dimensionally recognize and discriminate an image output from the projector 250. Referring to FIG. 7, the processor 211 of the wearable electronic device 200 can three-dimensionally recognize the image 720 received through the camera 706 and comparatively analyze the image output from the projector 250 and the image having the pointer 725. The processor 211 confirms the same regions in the image output from the projector 250 and the image received through the camera and indicates the central point of the camera (the central point of the user's visual line) by the pointer 725. That is, the processor 211 indicates the user's visual line on the image using the OPEN CV library. In addition, the processor 211 enlarges or reduces the image with the pointer 725 as the center. For example, the processor 211 of the wearable electronic device 200 enlarges or reduces the output image using a sensor unit 238. In addition, the processor 211 causes the sensor unit 238 to sense the user's gesture or touch input and to perform various functions. The sensor unit 238 is installed at a position in the wearable electronic device 200 where it can sense the user's gesture or touch input. The processor 211 discriminates a touch pad provided on the wearable electronic device 200 as a first touch pad or a second touch pad and variously set touch methods such as first touch pad recognition, second touch pad recognition, simultaneous recognition, and double click of each touch pad. For example, when the user's touch input exists at a specific position of the wearable electronic device 200, the processor 211 adjusts the focus again or enlarges or reduces the image with the focus as the center. In addition, the user may also copy the image, move the image to a specific position, or scroll the image using the sensor unit 238. Further, the touch pads can be detached from or attached to the wearable electronic device 200.

Figure 9:
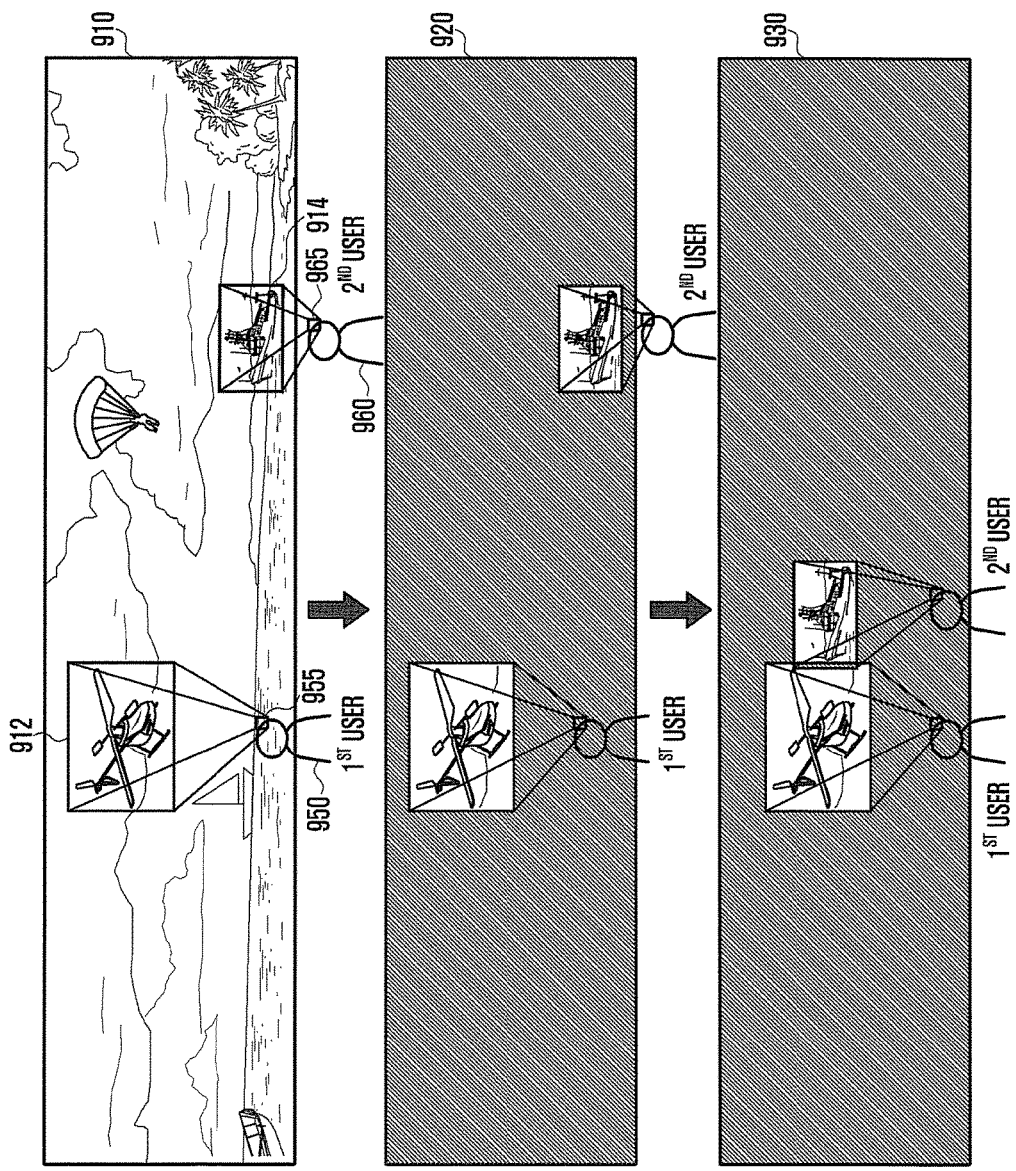
FIG. 9 illustrates a method of capturing a part of an image by a wearable electronic device, and comparing captured two images according to an embodiment of the present disclosure.

FIG. 9 illustrates a method of capturing a part of an image by a wearable electronic device, and comparing captured two images according to an embodiment of the present disclosure.

Referring to FIG. 9, in picture 910, the processor 211 of the wearable electronic device 200 causes a part to be captured from the entire image and causes the captured image to be output from the projector 250. In picture 910, two wearable electronic devices can capture different parts from the entire image using the projectors attached thereto, respectively. For example, in picture 910, a first wearable electronic device 955 of a first user 950 can perform the capture with a helicopter as the center. In addition, a second wearable electronic device 965 of a second user 960 can perform the capture with a ship as the center. The first image 912 and the second image 914, which are captured by the first user 950 and the second user from the picture 920, are output to the screen by the first user 950 and the second user 960. That is, the first wearable electronic device 955 of the first user 950 outputs the first image 912 captured with the helicopter as the center, and the second wearable electronic device 965 of the second user 960 outputs the second image 914 captured with the ship as the center to the screen. In picture 930, the second user 960 operates the second wearable electronic device 965 to move the second image 914 to one side of the first image 912 output from the first wearable electronic device 955 of the first user 950 and to compare the two images. That is, the user may capture a part of a specific image using the wearable electronic device 200 so as to utilize the captured image.

Figure 10:
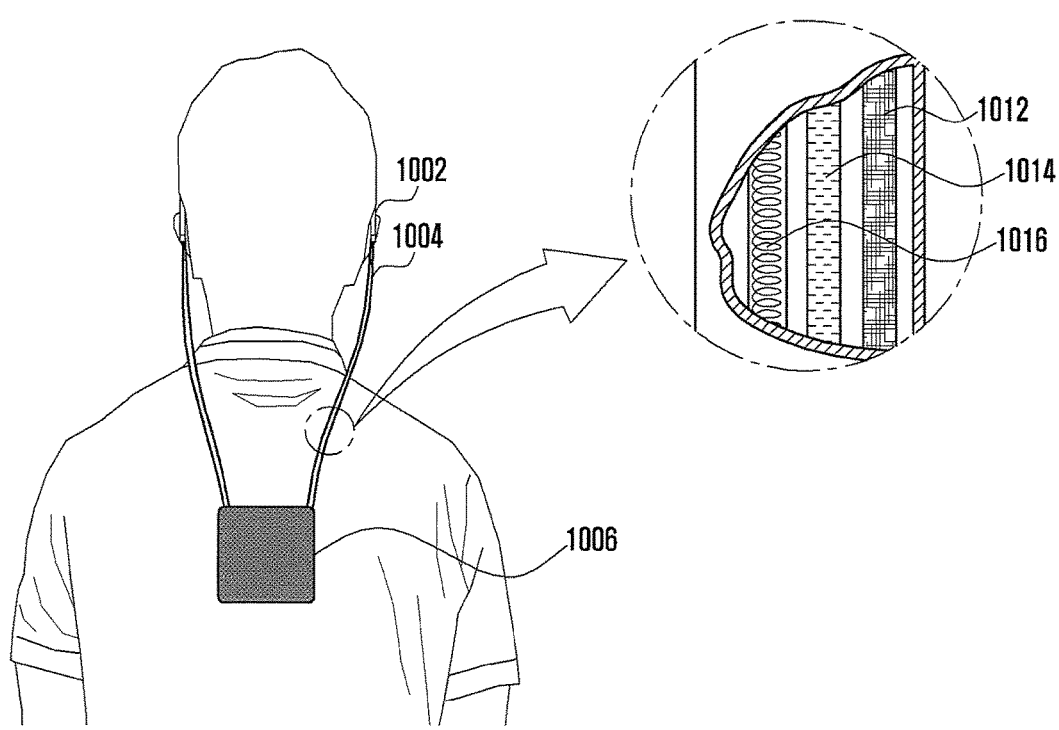
FIG. 10 illustrates a structural connection of an antenna and a battery in a wearable electronic device according to an embodiment of the present disclosure.

FIG. 10 illustrates a method for structurally connecting an antenna and a battery in a wearable electronic device according to an embodiment of the present disclosure.

Referring to FIG. 10, a wearable electronic device 200 is electronic spectacles. Here, a connection member 1004 is connected to each ear hooking part 1002, which is the end part of each of the left temple of the electronic spectacles and the right temple. In addition, a battery 1006 can be connected to the connection member 1004 to supply power to the wearable electronic device 200. That is, a power supply line 1012 is embedded in the connection member 1004 so that the wearable electronic device 200 can be supplied with power from the battery 1006. In addition, an antenna 1016 is embedded in the connection member 1004 so as to allow the wearable electronic device 200 to wirelessly communicate with a projector 250 or any other electronic device. The antenna 1016 embedded in the connection member 1004 can be embedded at a position where the antenna 1016 is not affected by the user's body that absorbs electromagnetic waves. That is, the wearable electronic device 200 includes the antenna 1016 at a specific position in the connection member 1004 extending from the user's ears to the neck. Here, the specific point may be a point where the electromagnetic waves are less affected by the user's body. According to the present embodiment, it is difficult to embed a power supply device in the wearable electronic device 200. Thus, the power supply device can be connected to the connection member 1004 so that the wearable electronic device can be supplied with power. If the power supply device is embedded in the wearable electronic device 200, the external battery 1006 of the wearable electronic device 200 can be omitted. The battery 1006 connected with the wearable electronic device 200 via the connection member 1004 can be positioned at the user's neck side to be supported by the user's body. The battery 1006 can be constituted with a single large battery or a battery pack in which small batteries are connected with each other. The internal configuration of the connection member 1004 includes a power supply line 1012 for supplying power from the battery 1006 to the wearable electronic device 200 and a signal input/output line 1014 and an antenna 1016 that enables the wearable electronic device 200 to transmit a signal to or receive a signal from another wearable electronic device 200.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A wearable electronic device comprising:
a glass;
a projector configured to output one or more images;
a shutter unit positioned in front of the projector and configured to display the one or more images output from the projector on the glass or in an outward direction; and
a control unit configured to control the shutter unit such that one of the one or more images is displayed outwardly through the shutter unit and another image is reflected by the shutter unit to be displayed on the glass.
2. The wearable electronic device of claim 1, wherein the projector is separated from the wearable electronic device.
3. The wearable electronic device of claim 1, wherein the shutter unit is capable of displaying the images on the glass and displaying the images in the outward direction, and wherein the shutter unit opens and closes a shutter at predetermined time intervals to reflect and display the one or more images output from the projector toward the glass or in the outward direction.

4. The wearable electronic device of claim 2, further comprising a wireless communication unit,
wherein the control unit is configured to control the wireless communication unit to transmit the one or more images to the projector.
5. The wearable electronic device of claim 1, wherein the glass includes a translucent reflector configured to reflect the one or more images output from the projector.
6. The wearable electronic device of claim 5, wherein the translucent reflector adjusts a transparency of the translucent reflector according to a user's setting.
7. The wearable electronic device of claim 5, wherein the translucent reflector is configured such that the one or more images are projected thereon to be visible to a user.
8. The wearable electronic device of claim 1, wherein the glass further comprises a translucent display configured to display an image such that the one or more images is received from the shutter unit.
9. The wearable electronic device of claim 1, wherein the wearable electronic device is formed in as a spectacle type electronic device, and
the spectacle type electronic device comprises:
a left temple of the spectacle type electronic device;
a right temple of the spectacle type electronic device;
a connection member interconnecting the left and right temples; and
a battery connected to the connection member and configured to supply power to the spectacle type electronic device.
10. The wearable electronic device of claim 1, further comprising a connection unit configured to couple the wearable electronic device to the projector through a wireline connection,
wherein the control unit is configured to transmit the one or more images or supply power to the projector through the connection unit.
11. A method for outputting an image of a wearable electronic device provided with a shutter unit and a projector, the method comprising:
controlling the shutter unit such that one of one or more images is displayed outwardly through the shutter unit and another image is reflected by the shutter unit to be displayed on a glass.
12. The method of claim 11, further comprising:
transmitting the one or more images to the projector.
13. The method of claim 12, wherein the transmitting of the one or more images to the projector comprises:
when the projector is attached to the wearable electronic device, transmitting the one or more images to the projector via a wireline connection through a connection unit; and
when the projector is separated from the wearable electronic device, transmitting the one or more images to the projector wirelessly through a wireless communication unit.
14. The method of claim 11, wherein the controlling of the shutter unit comprises:
when a mode switch signal is confirmed, controlling the shutter unit.
15. The method of claim 14, wherein the shutter unit is controlled to open and close a shutter at predetermined time intervals.
16. The method of claim 14, wherein the controlling of the shutter unit comprising:
when the mode switch signal is not confirmed, controlling the shutter unit to display the one or more images outwardly.

17. The method of claim 11, wherein the glass comprises a translucent reflector configured to display the image such that the image is received from the shutter unit.

18. The method of claim 17, wherein the translucent reflector adjusts a transparency of the translucent reflector according to a user's setting, and allows the one or more images to be projected thereon to be visible to the user.

19. The method of claim 11, wherein the wearable electronic device is formed in a spectacle type electronic device, and the spectacle type electronic device comprises:
a left temple of the spectacle type electronic device;
a right temple of the spectacle type electronic device;
a connection member interconnecting the left and right temples; and
a battery connected to the connection member to supply power to the spectacle type electronic device.

\* \* \* \* \*